J. L. LOTSCH.
STORAGE BATTERY.
APPLICATION FILED AUG. 14, 1918.
1,301,780.
Patented Apr. 22, 1919.
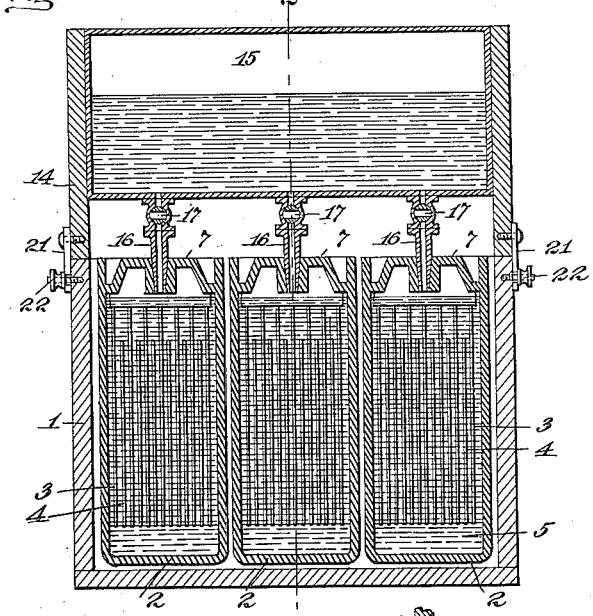
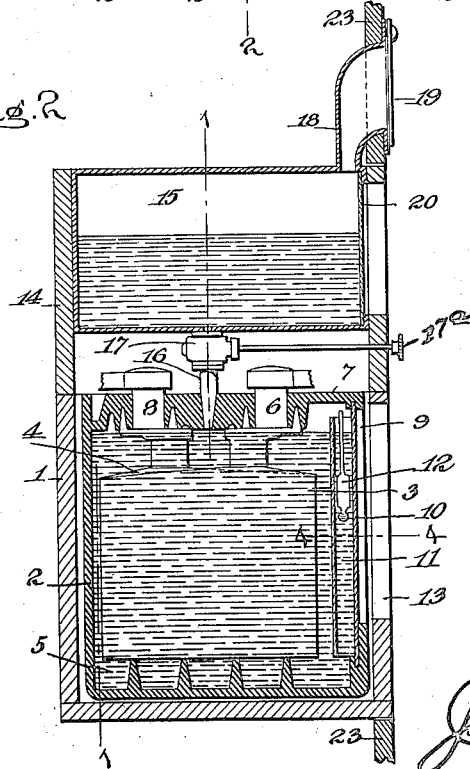
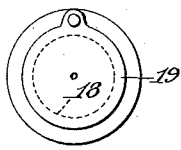
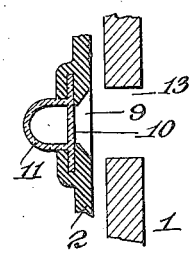
Inventor
John L. Lotsch

UNITED STATES PATENT OFFICE.

JOHN L. LOTSCH, OF BROOKLYN, NEW YORK.

STORAGE BATTERY.

1,301,780.	Specification of Letters Patent.	Patented Apr. 22, 1919.

Application filed August 14, 1918. Serial No. 249,767.

*To all whom it may concern:*

Be it known that I, JOHN L. LOTSCH, a citizen of the United States, and a resident of the borough of Brooklyn, county of Kings, city and State of New York, have invented a certain new and useful Improvement in Storage Batteries, of which the following is a specification.

My invention relates to wet batteries, and more particularly to storage batteries for use in motor vehicles, and has for its objects to provide means for filling the cells with liquid and for replenishing the same to compensate for evaporation, etc.

I have discovered that one of the constant sources of trouble to the motorist is caused by the failure of the storage battery to function properly. In order to overcome this source of trouble, it is necessary that the battery be always fully charged, and also to have the required amount of water in each cell so that the plates be sufficiently covered. In order to keep the battery in good condition, it must be constantly kept under observation, and motorists must carry a water bottle of distilled water for use as and when required. The failure or omission to carry the bottle of water makes it necessary to stop at a garage, or some place where distilled water is obtainable. (Infrequently, one neglects to carry the bottle of distilled water). To ascertain whether the battery is fully charged, it is likewise necessary to have a hydrometer, so that one may take frequent readings of the electrolytic solution of the batteries. It invariably happens that one usually neglects to take along a hydrometer, and consequently it is impossible to determine the condition of the battery, until trouble manifests itself through the fact that the battery will no longer perform its proper functions.

The objects of this invention are to overcome the difficulties hereinbefore noted, and to provide a storage battery which will have a reserve tank of distilled water, having ready communication with the battery, having automatic supply means, and employing in connection with the battery, hydrometer equipment so that readings of the specific gravity of the solution therein may be always visible and determinable, and means so that the amount of solution is indicated for observation through visual means.

A further object is to provide means whereby the level of the liquid in the cells and the specific gravity thereof may be ascertained without opening the cells.

A further object is to provide means for automatically filling the cells of the battery with liquid.

A further object is to provide means for storing a reserve supply of liquid, to indicate the quantity of reserve supply of liquid, and to provide means for replenishing the reserve liquid supply to compensate for usage, etc.

A further object of the invention is the provision of means of the character described, which are simple in construction, thoroughly reliable and efficient in its purpose and operation.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The inventive idea involved is capable of receiving a variety of mechanical expressions, one of which for the purpose of illustrating the invention, is shown in the accompanying drawings.

The invention will be first described in connection with the accompanying drawings illustrating one embodiment of my invention, wherein similar reference characters are used to designate corresponding parts throughout the several views, and then more specifically defined and indicated in the appended claims.

In the drawings,—

Figure 1 is a longitudinal section of a storage battery containing three cells, the section being taken on the line 1—1 of Fig. 2;

Fig. 2 is a transverse section taken on the line 2—2 of Fig. 1;

Fig. 3 is a detail front elevation of the tank filling opening and the cover therefor; and Fig. 4 is an enlarged detail section on the line 4—4 of Fig. 2.

My invention may be employed in connection with any form of wet battery for use in any situation, but I have illustrated it in connection with a storage battery for use in motor vehicles.

In the drawings, 1 indicates a casing or container made of any suitable material, in which is contained a plurality of jars 2 of di-electric material, each of which with its positive grids 3 and negative grids 4 and electrolyte 5 constitutes a cell. The positive grids 3 are connected to an element 6 which projects through the cover 7 of the jar and the negative grids 4 have a similar connection 8. By means of the connections 7 and 8 the cells may be properly connected together and to the leads.

Each jar 2 is provided at one side with an aperture, opening, or window 9 which is covered by a transparent panel 10 preferably of heavy glass. The transparent panel is affixed, attached, fastened or inserted in any well known manner. The panel carries integrally therewith a tubular well 11 open at the top and bottom in order that the electrolyte of the cell may enter the same. A properly balanced and graduated hydrometer 12 is carried in each well and is free to float in the electrolyte. The side of the casing 1 in proximity to each window 9 is provided with an opening 13 through which the level of the liquid in the jar and the hydrometer may be observed.

Mounted preferably on top of the casing 1 is a supplemental casing or box 14 carrying a tank 15 containing a solution of distilled water, for refilling the cells of the storage battery.

A plurality of tubes 16 corresponding in number to the number of cells, communicate with the bottom of the tank, and each tube enters an opening in the cover of a jar 2.

I have shown the lower end of each tube as tapered to engage a tapered opening in the jar cover to form a close fit between those parts, but I desire to have it understood that any other form of joint may be employed.

Each tube 16 is provided with a valve 17, the stem of which projects through a wall of the casing 14 and is provided with a handle 17ª by means of which the valve may be opened or closed. The tank 15 carries a filling tube 18 which is provided with a cover 19 to prevent the entrance of dirt or dust. One side of the tank is provided with a transparent panel 20 through which the level of the water in the tank may be observed, and the casing 14 is cut away opposite the panel 20.

I have shown the casing 14 as secured to the top of the casing 1, by means of hooks 21 locked to the casing 1 by bolts and nuts 22 but any other fastening means may be employed.

It will be understood that all of the parts may be constructed of material which will resist the action of solution in cells and the gases generated therein.

The apparatus may be located at any convenient point on the vehicle and mounted in any desired portion or wall of the body. Preferably it is designed to be carried in the engine hood and supported in front of the dash 23 Fig. 2 which is cut away so that the fronts of the casings 1 and 14 may form a part of the dash and be at all times visible to the operator. The mouth of the filling tube 18 is flush with the back of the dash and at all times accessible for filling the tank.

In accordance with the provisions of the patent statute, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and, therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim and desire to secure by Letters Patent is as follows:

1. A battery, comprising a non-transparent jar, adapted to contain a liquid, an opening in one side of said jar, a transparent panel fitted in said opening, and a well fixed to and carried by said panel and projecting into and communicating with the interior of the jar, and a hydrometer in said well exposed to view through said panel and opening.

2. A battery, comprising a non-transparent jar, adapted to contain a liquid, an opening in one side wall of said jar, a transparent panel fitted in said opening, and a well formed integrally with and carried by said panel and extending into and communicating with the interior of the jar, and a hydrometer in said well exposed to view through said panel and opening.

3. In an apparatus of the character described, a battery jar adapted to contain a liquid, a tank or container for a reserve supply of liquid arranged adjacent to said jar, means for indicating the level of the contents of the reserve tank, and means for affording communication between the reserve tank and jar.

4. In an apparatus of the character described, a battery jar adapted to contain a liquid, a tank or container for a reserve supply of liquid arranged adjacent to said jar, means for indicating the level of the contents of the reserve tank, means for affording communication between the reserve tank and jar, and means for controlling communication between the tank and jar.

5. A battery adapted to be supported in a wall or other structure upon one side thereof, comprising a jar adapted to contain a liquid, a casing for the jar having an opening in one of its side walls adapted to be supported in an opening in said wall, an opening in one side of the jar opposite the opening in said casing, a transparent panel fitted in the opening in said jar, a well adjacent to said panel extending into and communicating with the interior of the jar, and a hydrometer in said well exposed to view through said panel and openings on the other side of said supporting wall.

6. In an apparatus of the character described, a battery jar adapted to contain a liquid, a casing for the jar having an opening in one of its side walls adapted to be supported in an opening in a wall or other fixture and projecting from one side thereof, an opening in one side of the jar opposite the opening in said casing, a transparent panel in the opening in said jar, a well in said jar adjacent to said panel communicating with the interior of the jar, a hydrometer in said well and exposed to view through said panel and openings on the other side of said supporting wall, a reserve liquid supply tank and casing therefor mounted upon the jar casing and fitted in an opening in said supporting wall, a transparent panel in said supply tank, and an opening in said tank casing opposite said panel, thereby exposing to view the liquid level in said supply tank upon the opposite side of the supporting wall, and means for discharging the liquid from said tank into said jar.

7. In an apparatus of the character described, a battery jar adapted to contain a liquid, a casing for the jar having an opening in one of its side walls adapted to be supported in an opening in a wall or other fixture and projecting from one side thereof, an opening in one side of the jar opposite the opening in said casing, a transparent panel in the opening in said jar, a well in said jar adjacent to said panel communicating with the interior of the jar, a hydrometer in said well and exposed to view through said panel and openings on the other side of said supporting wall, a reserve liquid supply tank and casing therefor mounted upon the jar casing and fitted in an opening in said supporting wall, a transparent panel in said supply tank, and an opening in said tank casing opposite said panel, thereby exposing to view the liquid level in said supply tank upon the opposite side of the supporting wall, means for discharging the liquid from said tank into said jar, and a filling tube fixed to said tank and adapted to be fitted in an opening in the supporting wall and opening upon the opposite side thereof.

8. In an apparatus of the character described, a battery jar adapted to contain a liquid, a casing for the jar having an opening in one of its side walls and adapted to be supported in an opening in a wall or other fixture and projecting from one side thereof, an opening in one side of the jar opposite the opening in the casing, a transparent panel fitted in the opening in said jar, a well in said jar communicating with the interior thereof, a hydrometer in said well exposed to view through said panel and openings on the other side of the supporting wall, a reserve liquid supply tank and casing therefor mounted upon the jar casing and fitting in an opening in the supporting wall, an opening in the top of said jar, a transparent panel in said supply tank, and an opening in said tank casing opposite said panel thereby exposing to view the liquid level in said tank upon the opposite side of the supporting wall, a tube connected with the bottom of said reserve tank adapted to removably engage the opening in the top of said jar, a valve in said tube for controlling communication between said tank and jar, and a valve stem and handle therefor extending through the tank casing and exposed for operation on the opposite side of the supporting wall.

9. In an apparatus of the character described, a battery jar adapted to contain a liquid, a casing for the jar having an opening in one of its side walls and adapted to be supported in an opening in a wall or other fixture and projecting from one side thereof, an opening in one side of the jar opposite the opening in the casing, a transparent panel fitted in the opening in said jar, a well in said jar communicating with the interior thereof, a hydrometer in said well exposed to view through said panel and openings on the other side of the supporting wall, a reserve liquid supply tank and casing therefor mounted upon the jar casing and fitting in an opening in the supporting wall, a tapered opening in the top of said jar, a transparent panel in said supply tank, and an opening in said tank casing opposite said panel thereby exposing to view the liquid level in said tank upon the opposite side of the supporting wall, a tapered tube connected with the bottom of said reserve tank and adapted to removably engage the tapered opening in the top of said jar, a valve in said tube for controlling communication between said tank and jar, and a valve stem and handle therefor extending through the tank casing and exposed for operation on the opposite side of the supporting wall.

10. In an apparatus of the character described, the combination of a series of battery jars adapted to contain a liquid, a cover for each jar having an opening therein, a casing for said jars having a series of openings in one of its side walls and adapted to be supported in an opening in a wall or other structure and projecting from one side thereof, openings in said jars opposite the openings in said casing, a transparent panel fitted in the opening of each jar, a well in each jar adjacent to said panels communicating with the interior of the jars, a hydrometer in each of the wells exposed to view through said panels and the openings in the casing on the other side of said supporting wall, a reserve liquid supply tank and casing therefor mounted upon the jar casing and fitted in an opening in the supporting wall, an opening in said casing and a transparent panel in the wall of said tank, whereby the liquid level in said tank is exposed to view upon the opposite side of the supporting wall, a series of tubes communicating with and projecting from the bottom of said tank and adapted to removably engage the openings in the tops of said jars to afford communication between said tank and jars, valves in said tubes for controlling communication between said tank and jars, operating stems and handles for said valves extending through the wall of said tank casing and exposed and operable on the opposite side of the supporting wall or fixture, a filling tube for said tank projecting through an opening in the supporting wall and opening upon the opposite side thereof, and a closure for said filling tube.

This specification signed and witnessed this 12th day of August, 1918.

JOHN L. LOTSCH.

Witnesses:
C. WARSHAW,
M. JONES.